United States Patent [19]

Suzuki et al.

[11] Patent Number: 4,951,161
[45] Date of Patent: Aug. 21, 1990

[54] DEVICE FOR PREVENTING STICKING OF A MAGNETIC TAPE TO A ROTATING MAGNETIC HEAD DRUM

[75] Inventors: Tetsuya Suzuki; Yukio Ito; Kiyoshi Zogo, all of Tokyo, Japan

[73] Assignee: Clarion Co., Ltd., Tokyo, Japan

[21] Appl. No.: 235,117

[22] Filed: Aug. 22, 1988

[30] Foreign Application Priority Data

| Aug. 28, 1987 | [JP] | Japan | 62-216026 |
| Sep. 1, 1987 | [JP] | Japan | 62-218145 |
| Sep. 11, 1987 | [JP] | Japan | 62-227749 |
| Sep. 11, 1987 | [JP] | Japan | 62-227750 |

[51] Int. Cl.$^5$ .................. G11B 15/00; G11B 5/52
[52] U.S. Cl. ........................ 360/71; 360/85
[58] Field of Search ................ 360/71, 84, 85

[56] References Cited

U.S. PATENT DOCUMENTS

| 4,636,887 | 1/1987 | Kato et al. | 360/71 X |
| 4,686,591 | 8/1987 | Kobayashi et al. | 360/85 |
| 4,758,912 | 7/1988 | Yoshihiro et al. | 360/71 |

FOREIGN PATENT DOCUMENTS 61-187030 11/1986 Japan .
61-187031 11/1986 Japan .

Primary Examiner—John H. Wolff
Attorney, Agent, or Firm—Wallenstein, Wagner & Hattis, Ltd.

[57] ABSTRACT

In a magnetic recording/reproducing apparatus of the helical scanning type the rotation speed of the reels in operation is detected and it is judged to be abnormal, if the rotation speed exceeds the upper limit thereof. This upper limit can be varied, depending on various operating modes. When an abnormality is detected, the brake of the reels is driven and the rotation of the drum is stopped. After the tape has been stopped, the tape is unloaded while rotating the supply side reel and the take-up side reel, the drum remaining not rotated.

8 Claims, 11 Drawing Sheets

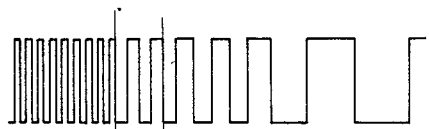
FIG.1A
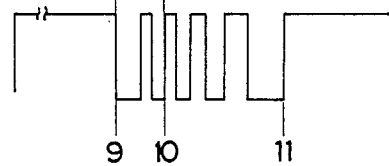
FIG.1B
FIG. 2
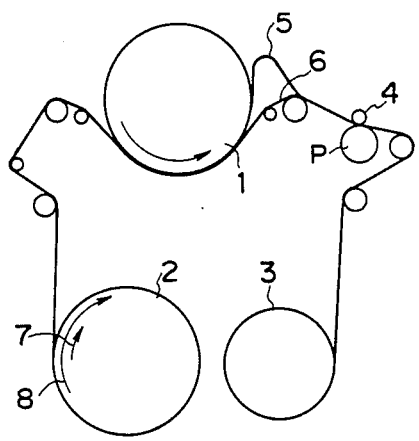

FIG. 7
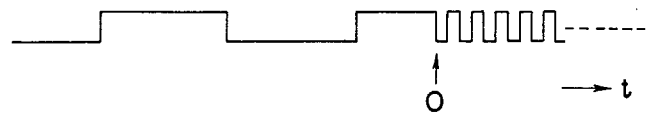
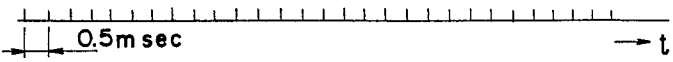
FIG.8A
FIG.8B
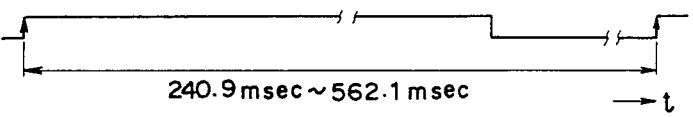
FIG. 9
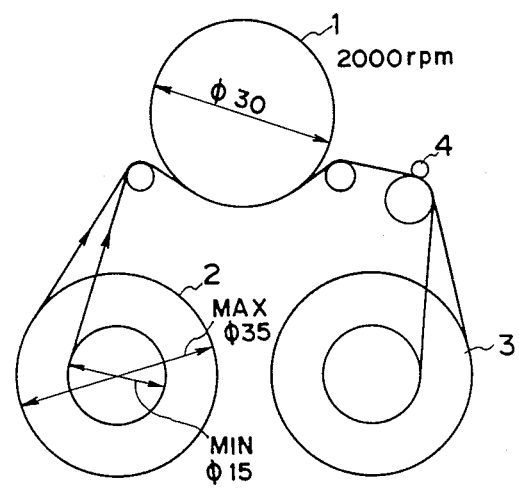

3 msec

→ t

DEVICE FOR PREVENTING STICKING OF A MAGNETIC TAPE TO A ROTATING MAGNETIC HEAD DRUM

FIELD OF THE INVENTION

This invention relates to a device for preventing sticking of a magnetic tape to a rotating magnetic head drum for helical scanning due to dew condensation in a magnetic recording/reproducing apparatus.

BACKGROUND OF THE INVENTION

It is often experienced that window glass of a vehicle is clouded due to dew condensation just after the starting of the drive in winter or in the rainy season. When men enter the vehicle and the temperature and the humidity in the vehicle rise rapidly, since the temperature of the metallic parts rises later than that of air in the vehicle because of the heat capacity thereof, dew condensation takes place also thereon just as on the surface of the window glass.

Recently R-DAT (Recordable Digital Audio Tape) has been developed and car audio devices employ R-DAT. Further, 8 mm VTRs (video tape recorders) for car are on sale and magnetic recording/reproducing apparatuses including a rotary magnetic head for the helical scanning method are used more and more widely as devices for a car.

However, since in a magnetic recording/reproducing apparatus of the helical scanning type, a tape is wound obliquely to a head drum rotating with a high speed and the head drum is rotated in contact to the magnetic tape with a relative speed of several m/sec in order to record information thereon, if dew condensation takes place on the rotating drum, the tape is stuck on the drum and the tape is drawn out in an instant. Thus the tape is disgorged in the neighborhood of the drum, as indicated in FIG. 11, or stuck around the drum, which can give rise in the worst case to an accident, because of which the cassette cannot be drawn out no more. In FIG. 11, reference numeral 1 is a drum; 2 is a S reel (supply side reel); 3 is a T reel (take-up reel); 4 is a capstan; and 5 is the disgorged tape. In general, in a home use VTR, the temperature is always supervised by a sensor and a heater is driven in a situation where dew is easily condensed, so that the neighborhood of the rotating drum is heated so as to prevent the appearance of the situation where dew is easily condensed. However, in the case where it is used for a car, in order to reduce the power consumption of the battery when the engine is not driven, it is necessary to keep the consumed current below several mA and therefore it is not possible to drive the heater without interruption as can be done for the home use VTR. Consequently, in the initial state, the temperature of the neighborhood of the rotating drum is the same as that of the ambient air. In addition, the room in the vehicle is almost closed and thus, when the temperature and the humidity rise rapidly as described previously, a situation, where dew is very easily condensed, appears. Since a certain period of time lapses before a dew condensation sensor detects the dew condensation state, under the rapid temperature and humidity rise, even if the operation of the system is adaped to stop by means of the dew condensation sensor, the accident described above can not surely prevent beforehand.

Further, even if the interior of the apparatus is not in the state where dew condensation takes place, when an extremely cold magnetic tape is brought in a warm room, it is conceivable also that dew condensation takes place on the tape itself and therefore it is impossible to prevent completely the sticking accident of the tape by using the dew condensation sensor disposed within the apparatus or a dehumidification measure.

Therefore, heretofore, in a case that the stoppage of the rotation of the reels, the capstans, the drum, etc. due to sticking of the tape in course of tape loading, recording/reproducing, etc. is detected, it is judged that the apparatus is not normal, an operation to power off the apparatus or to eject the cassette is effected. However, by this method the abnormality is detected, only when the tape is stuck really to the drum and it can rotate no more. Therefore, it was not possible to prevent beforehand the accident without impairing the tape.

OBJECT OF THE INVENTION

The object of this invention is to provide a device for preventing sticking of a magnetic tape on a rotating magnetic head drum in a magnetic recording/reproducing apparatus of the helical scanning type, which can detect instantaneously a sticking phenomenon and stop the tape before complete sticking so that the tape can be taken out safely without any damage.

SUMMARY OF THE INVENTION

In order to achieve the above object, a device for preventing sticking of a magnetic tape to a rotating magnetic head drum in an apparatus for recording/reproducing information on a magnetic tape according to this invention wherein to effect a tape loading, the tape is drawn out from a tape cassette, and which is loaded at a predetermined position in which reels are disposed, comprises detecting means for outputting detected values corresponding to the rotation period of one of the reels at the rotation of the reels, comparing means for comparing the detected values coming from the detecting means with a predetermined value, and drum stopping means for stopping the rotation of the drum, responding to the comparison output of the comparing means.

In a magnetic recording/reproducing apparatus of the helical scanning type, the tape forwarding speed differs extremely from the recording/reproducing speed by the rotating drum. If the tape is stuck to the rotating drum, since the tape is forwarded instantaneously by the drum, the rotation speed of the S reel is thereby rapidly increased. According to this invention, abnormality is detected at the moment when the tape begins to be stuck to the drum, and the supply reel is braked. In this way, even if a sticking phenomenon takes place, it is possible to suppress the forwarding amount of the tape to a value extremely small and thus to take out the cassette without impairing the tape.

FIG. 2 is a plan view illustrating the position of the S reel 2, the T reel 2, the drum and the tape at the moment, when sticking of the tape has begun. In the figure, the reference numerals, which are used also in FIG. 11 in common, represent the items identical or corresponding to those indicated in FIG. 11 and reference numeral 6 indicates the normal position of the tape; 7 and 8 are arrows representing the rotation speeds of the S reel at a normal and an abnormal drive, respectively.

FIGS. 1(A) and 1(B) show the waveform of the drum FG pulses and that of the supply reel FG pulses, respectively, at this time. In the figure, reference numeral 9 indicates the point of time, where the sticking begins to take place; 10 the point of time, when the reel brake begins to operate; and 11 the point of time, when the reel has stopped.

BRIEF DESCRIPTION OF THE DRAWINGS

FIGS. 1A and 1B shows waveforms of the drum FG pulse and the reel FG pulse;

FIG. 2 is a plan view illustrating the position of the supply reel, the take-up reel, the drum and the tape at the moment, where sticking-of the tape has begun;

FIG. 7 shows waveform of the supply reel pulse, when an abnormality due to sticking of the tape takes place;

FIG. 8 shows waveforms of the clock pulse and the supply reel pulse;

FIG. 9 is a plan view for explaining the relation between the size of the reels and the number of pulses;

DETAILED DESCRIPTION OF EMBODIMENTS

Figure 4:
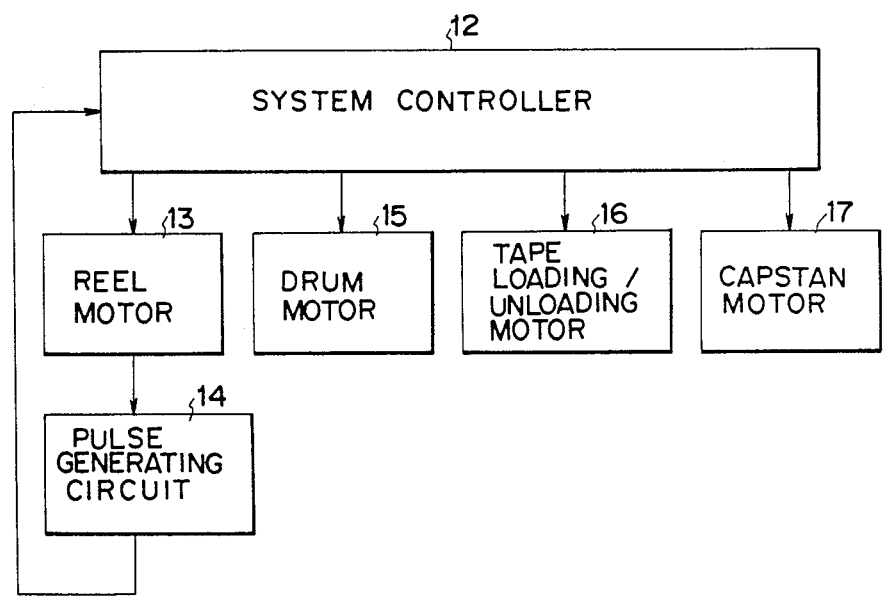
FIG. 4 is a block diagram illustrating the construction of the control device according to this invention.

FIG. 4 shows an embodiment, in which this invention is applied to a R-DAT. In this figure, reference numeral 13 represents a reel motor, which rotates the take-up reel 2 so as to wind up the tape. 14 is a pulse generating circuit, which generates e.g. pulses corresponding to the number of rotations per unit time of the supply reel 2. 15 is a drum motor, which rotates the rotating drum 1 having upper and lower drum potions 21', 22" (FIG. 17). 16 is a tape loading/unloading motor, which drives a tape loading mechanism (not shown in the figure) drawing out the tape from a cassette loaded at a predetermined position, where the supply and the take-up reels are disposed, winding the tape around the drum 1 and taking up the tape from the drum 1 so as to wind it on the take-up reel.

17 is a capstan motor, which drives a capstan (not shown in the figure) at the recording/reproducing rate. 12 is a system controller consisting of e.g. a microcomputer, which controls the motors 13 to 17 and receives pulses outputted from the pulse generating circuit 14. The pulse generating circuit 14 generates pulses, responding to the supply reel rotation, which itself is well known. The system controller 12 obtains a detection value corresponding to the supply reel rotation period, when the supply reel rotates, by counting the pulses stated above, compares this detection value with a predetermined value, and judges whether dew condensation has taken place on the drum 1 or not, depending on the result of the comparison. For example, when the detection value becomes smaller than the predetermined value, it is presumed that the tape is stuck on the drum 1 because of dew condensation and the drum motor 15 is controlled so as to stop the drum rotation.

In this case, the reels can be considered to be rotated at the reproducing mode state or at the tape loading in a R-DAT.

Hereinbelow the concrete operation and effects of the embodiment described above will be explained.

In a R-DAT the usual tape forwarding speed is 8.15 mm/sec at the standard speed and 12.225 mm/sec at a speed 1.5 times as high as the standard one. On the other hand, the circumference speed of the rotation of the drum is 3.14 m/sec for a diameter of 30 mm, 2000 rpm, and the tape winding angle of 90° and therefore there is a remarkable difference between the tape forwarding speed and the circumference speed of the drum.

When the tape is stuck on the drum 1 during rotating, the tape is forwarded in the rotating direction of the drum with a speed higher than the normal one and drawn out from the supply reel. According to an experiment for a R-DAT, since the tape is taken out with a speed around 1.6 m/sec at the moment when the tape is stuck on the drum, the supply reel is rotated with an extremely high speed.

For detecting the rotation of the supply reel a reflecting sensor (not shown in the figure) outputting 24 pulses per turn is used. Therefore it is possible to detect the rotating speed of the supply reel by measuring the period of the pulse during rotation.

During recording/reproducing, the number of rotations per unit time of the supply reel is greatest at the proximity of the tape end and at the speed 1.5 times as high as the standard one. It is:

$$P = \frac{v_{1.5}}{\pi D_{min}} \times 24 = \frac{12.225}{15 \pi} \times 24 \approx 6.2 \text{ pulses/sec}$$

and the period thereof $T_A = 161$ msec.

Further, at the tape loading/unloading, the number of rotations per unit time is 0.4~1 turn/sec. The number of pulses per turn P=24 and the period thereof is about $T_B = 41.6$ msec.

On the other hand, if the tape speed when the tape is stuck on the drum is supposed to be 1.6 m/sec, in the proximity of the beginning of winding of the tape, the rotation of the supply reel is slowest and the number of pulses per unit time and the period thereof are given by:

$$P = \frac{v_{1600}}{\pi D_{min}} \times 24 = \frac{1600}{\pi \times 36.5} \times 24 = 334.8 \text{ pulses/sec}$$

$$T_C = 3 \text{ m sec}$$

where $D_{max}$ denotes the greatest winding diameter in the R-DAT, this difference being sufficient for detecting an abnormality in the rotation. Therefore the pulse period when the supply reel rotates is measured and when the period is shorter than a predetermined time, it is judged that an abnormality has taken place. At this time, the supply reel is braked and at the same time the rotation of the drum is stopped. Since, according to this embodiment, by measuring the pulse period in this way, the sticking of the tape can be detected for 1.5 pulses, the rotation angle of the reel from the beginning of the sticking to the detection thereof is given by:

$$1.5/24 \times 360° = 22.5 \text{ (degree)}$$

The length of the tape drawn out from the cassette during this period of time is at greatest as small as:

$$\frac{22.5}{360} = \pi D_{max} = 7.2 \text{ mm}$$

Therefore, even if the tape is stuck on the drum, it is possible to take out the tape from the cassette without any difficulty. Since as described above, in the prior art, detection of tape sticking on the head drum is not carried out, the tape was drawn out from the cassette at a high speed, a large amount of the tape was disgorged in the neighborhood of the drum and the tape was stuck on the drum. According to this invention, this inconvenience is removed, i.e. the abnormality is detected instantaneously by detecting the beginning thereof the supply reel rotating with a higher speed and in this way the tape running can be stopped instantaneously by stopping the drum and controlling the supply reel.

Figure 3:
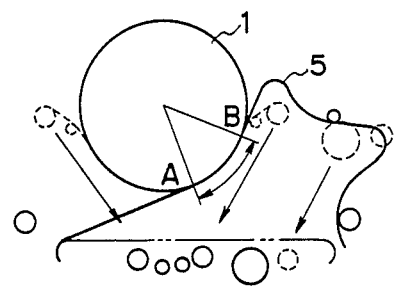
FIG. 3 is a plan view of the drum and the tape, in the case where the tape is stuck not only on the rotating drum but also on the lower drum and only the supply reel rotates.

In the case where the tape is stuck not only on the rotating drum 21' but also on the lower drum 21', at the tape unloading, even if the supply reel is rotated backward, the tape stuck on the lower drum between A and B in FIG. 3 can not be wound back and thus the slackness can not be removed on the capstan side. In this case, it is possible to remove the slackness on the capstan side by rotating also the take-up reel at the tape unloading and to retract the tape from the drum.

Figure 5:
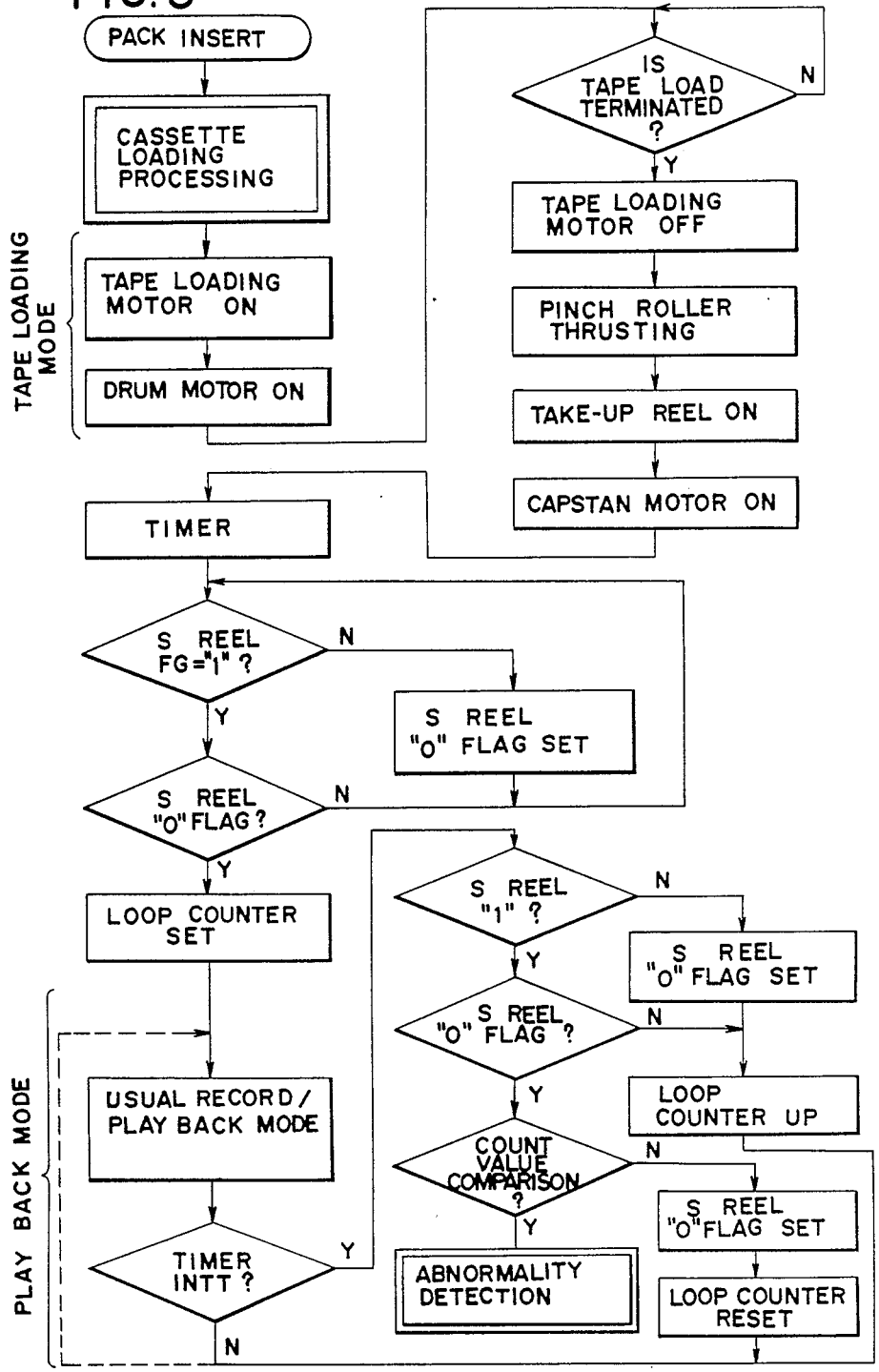
FIGS. 5, 12 and 15A and B are flowcharts for explaining the working mode of a device for preventing sticking of a magnetic tape on a rotating magnetic head drum according to this invention.

FIG. 5 is a flowchart for explaining the operating mode described above. In the figure, the timer is a timer for preventing erroneous operations at the beginning of reproducing, which can be produced, because tachopulses are generated more rapidly than those generated normally by the supply reel, when the slackness is removed.

The loop returning from 'S reel "0" flag?' to 'S reel FG="1"?' is a loop for finding the point where the waveform of the supply reel FG pulse rises. When the supply reel FG pulse is equal to "0", a "0" flag is set.

By 'TIMER INTT?' a timer interruption takes place for every 0.5 msec and the number of timer interruptions from the rise of a S reel FG to the rise of the succeeding supply reel FG pulse is counted. That is, the period T=0.5 msec × count value.

Figure 6:
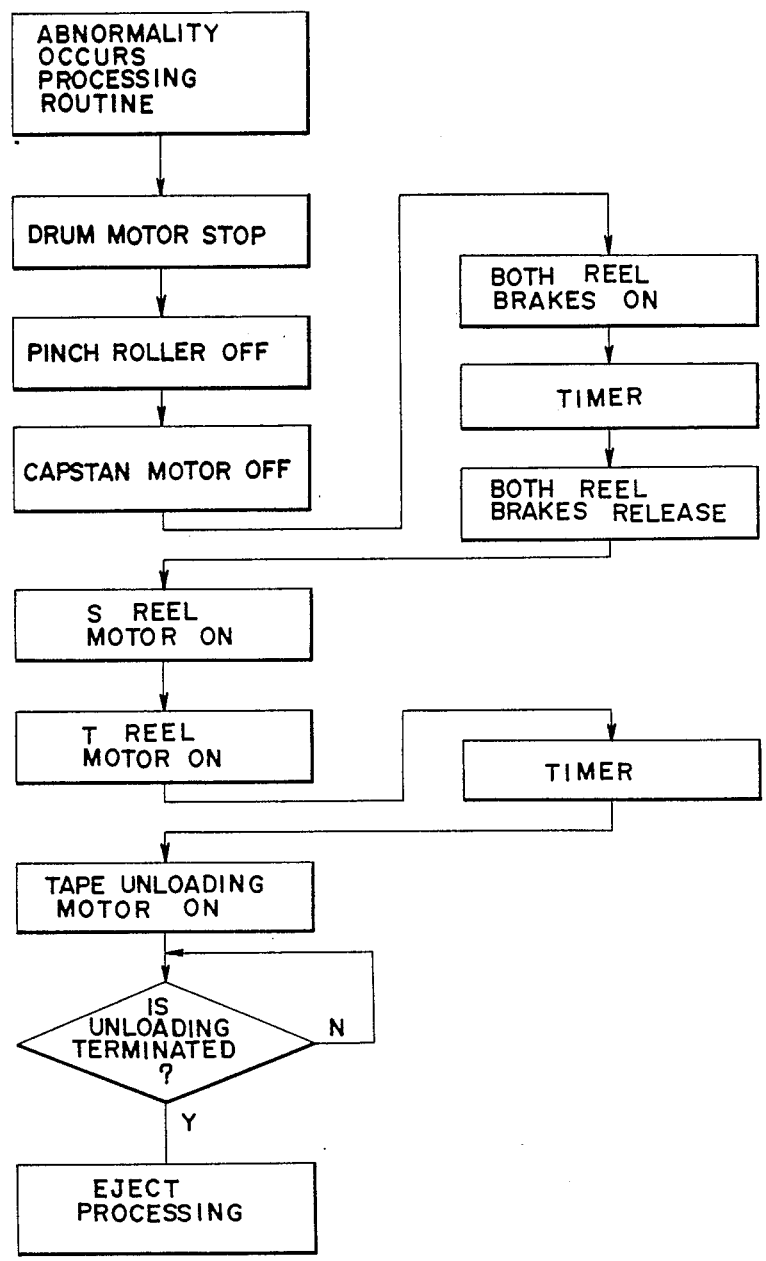
FIGS. 6, 13 and 16 are flowcharts indicating various processing methods after the detection of the sticking of the tape.

FIG. 6 is a flowchart indicating a processing method after the detection of the sticking of the tape. In the figure, the supply reel motor and the take-up reel motor are motors which are rotated for removing the slackness.

FIG. 7 shows waveform of the supply reel pulse, when an abnormality due to sticking of the tape takes place, in which O indicates the point of time of the beginning of sticking of the tape on the drum.

FIGS. 8A and 8B show waveforms of the clock pulse and the supply reel pulsed respectively (b). In the flowchart described above "1" and "0" of the supply reel pulses are detected with an interval of 0.5 msec and they are counted up for every 0.5 msec from the rise of an supply reel pulse to the rise of the succeeding one. Thus it is judged whether the number of pulses between them is in a normal range or not. For example, since the shortest wavelength at the play back is 241 msec, if the count value is greater than 482, the operation can be judged to be normal.

Referring to FIG. 9, the number of supply reel pulses at the standard speed can be determined, as follows:

Tape speed L = 8.15 mm/sec
Diameter of S reel  $\phi$ min = 15 mm
                    $\phi$ max ≈ 35 mm
Reel pulse P = 24 per turn The number of pulses generated by the supply reel per unit time is given by:

$$n_{max} = \frac{L}{\phi_{min} \times \pi} \times P = \frac{8.15}{15 \times \pi} \times 24$$
$$= 4.15 \quad (\lambda = 240.9 \text{ m sec})$$

$$n_{min} = \frac{L}{\phi_{max} \times \pi} \times P = \frac{8.15}{35 \times \pi} \times 24$$
$$= 1.78 \quad (\lambda = 562.1 \text{ m sec})$$

On the other hand, the number of supply reel pulses when the tape is stuck on the drum can be determined, as follows. Using the diameter of the drum, which is 30 mm, and the number of rotations per unit time, which is 2000 rpm, the tape speed L is given by:

$$L = 30 \times \pi \times \frac{2000}{60} = 3141.6 \text{ mm/sec}$$

The number of pulses generated by the S reel per unit time is given by:

$$n_{max} = \frac{L}{\phi_{min} \times \pi} \times P = \frac{3141.6}{15 \times \pi} \times 24$$
$$= 1600 \quad (\lambda = 0.625 \text{ m sec})$$

$$n_{min} = \frac{L}{\phi_{max} \times \pi} \times P = \frac{3141.6}{35 \times \pi} \times 24$$
$$= 685.7 \quad (\lambda = 1.45 \text{ m sec})$$

L=3141.6 mm/sec described above represent the maximum value and in reality it is confirmed experimentally that it is reduced to about a half because of sliding of the tape on the drum and the torque down of the drum motor. Consequently the real wavelength of the supply reel pulse at the sticking of the tape is about 1.2 msec to 3 msec.

Figure 10A:
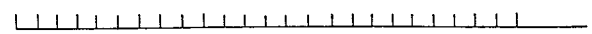
FIGS. 10A and 10B show reel pulse waveforms during normal and abnormal conditions respectively.
Figure 10B:
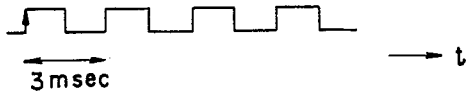
Figure 11:
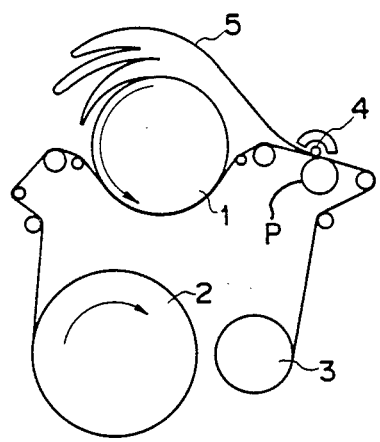
FIG. 11 is a plan view showing a disgorged tape.

At an abnormality, as indicated in FIG. 10, there exist only 6 counts from the rise of a supply reel pulse to the rise of the succeeding one, and therefore it can be judged to be abnormal.

Further, as another method, by which the system controller 12 judges that dew condensation takes place, it can be adopted as a criterion that the number of rotations per unit time of the supply reel is detected, starting from the count pulses described above and the count value thus obtained exceeds a predetermined value.

Figure 12:
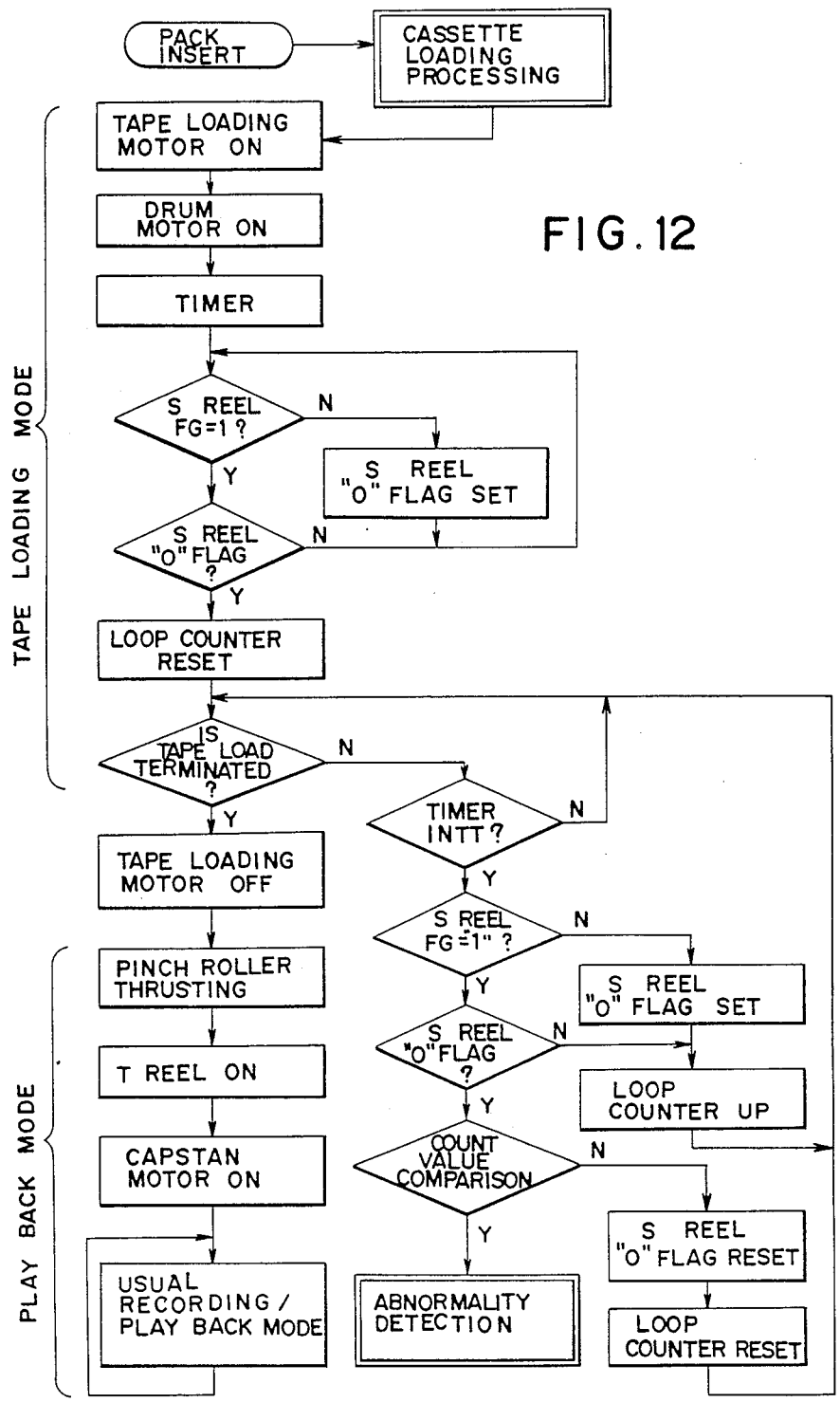
Figure 13:
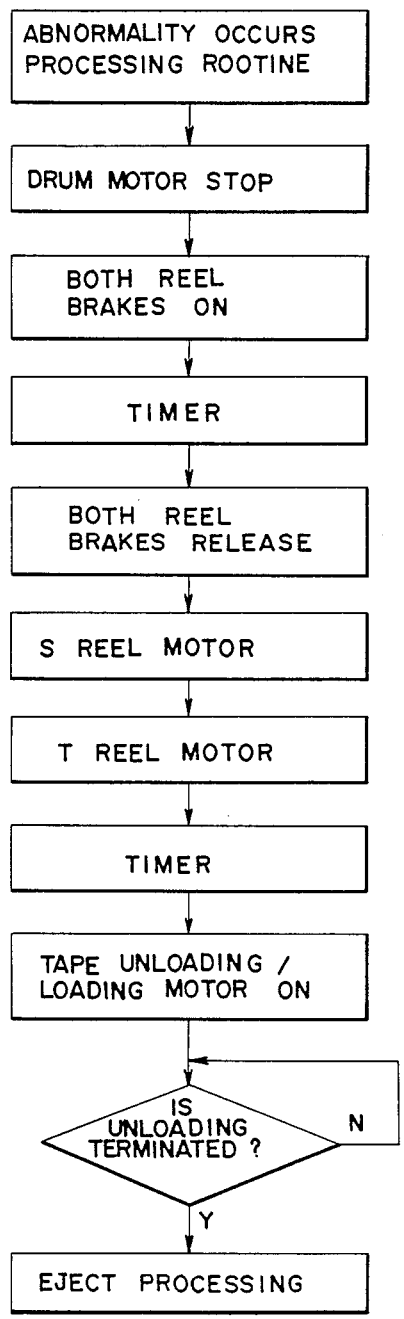

FIGS. 12 and 13 are flowcharts indicating the operation of the system controller 12 in such a case. The system controller 12 detects that the number of rotations per unit time of the supply reel exceeds predetermined values at the tape loading and at the recording/reproducing and can stop the rotation of the drum, responding to this detection. In this case, the predetermined values are so set that the first predetermined value is for the tape loading and the second one is for recording/reproducing.

Figure 14:
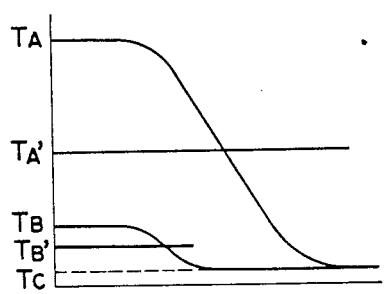
FIG. 14 is a graph indicating variations of the supply reel pulse with respect to time, when the tape is stuck on the drum.

When the tape is stuck on the drum as stated previously, since the supply reel has a certain mass, a certain time lapses until the period of pulses generated by the rotation of the supply reel decreases to $T_C$, as indicated in FIG. 14. During this time, the tape is wound more or less by the drum due to the sticking. FIG. 14 is a graph indicating variations of the period of the supply reel pulse with respect to time, in which the flat portion on the left side represents the period when the tape is stuck completely on the drum. In order to suppress the disgorged amount of the tape, $T_A'$ (first predetermined value) and $T_B'$ (second predetermined value) are separately disposed. For the recording/reproducing $T_A'$ is set at the middle point of $T_A = 161$ msec and $T_C$ and for the tape loading $T_B'$ is set at the middle point of $T_B = 41.6$ msec and $T_C$. In the different modes, it is possible to suppress the slackness due to the sticking to the minimum by comparing always the real period with $T_A'$ or $T_B'$.

Figure 15A:
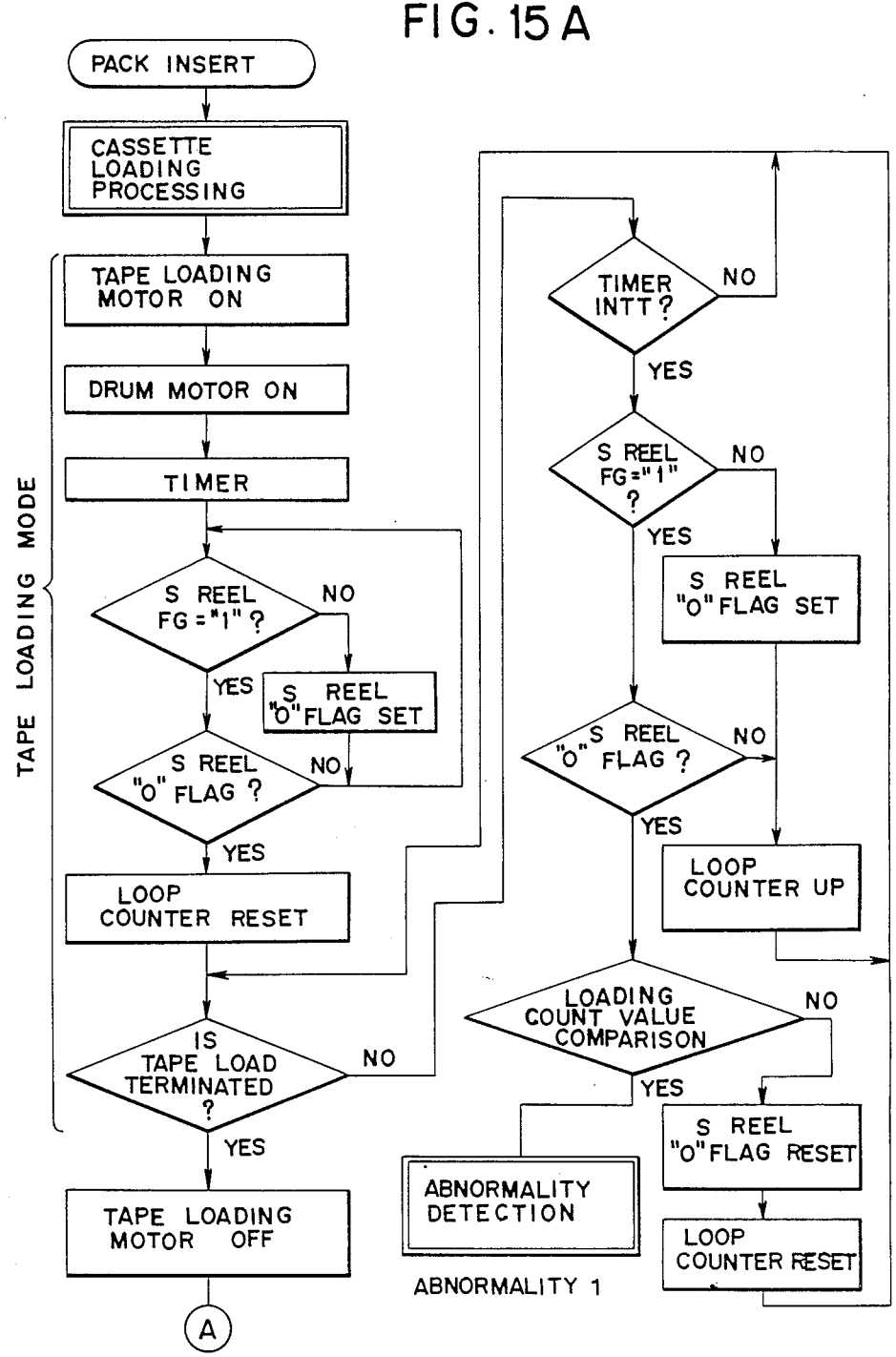
Figure 15B:
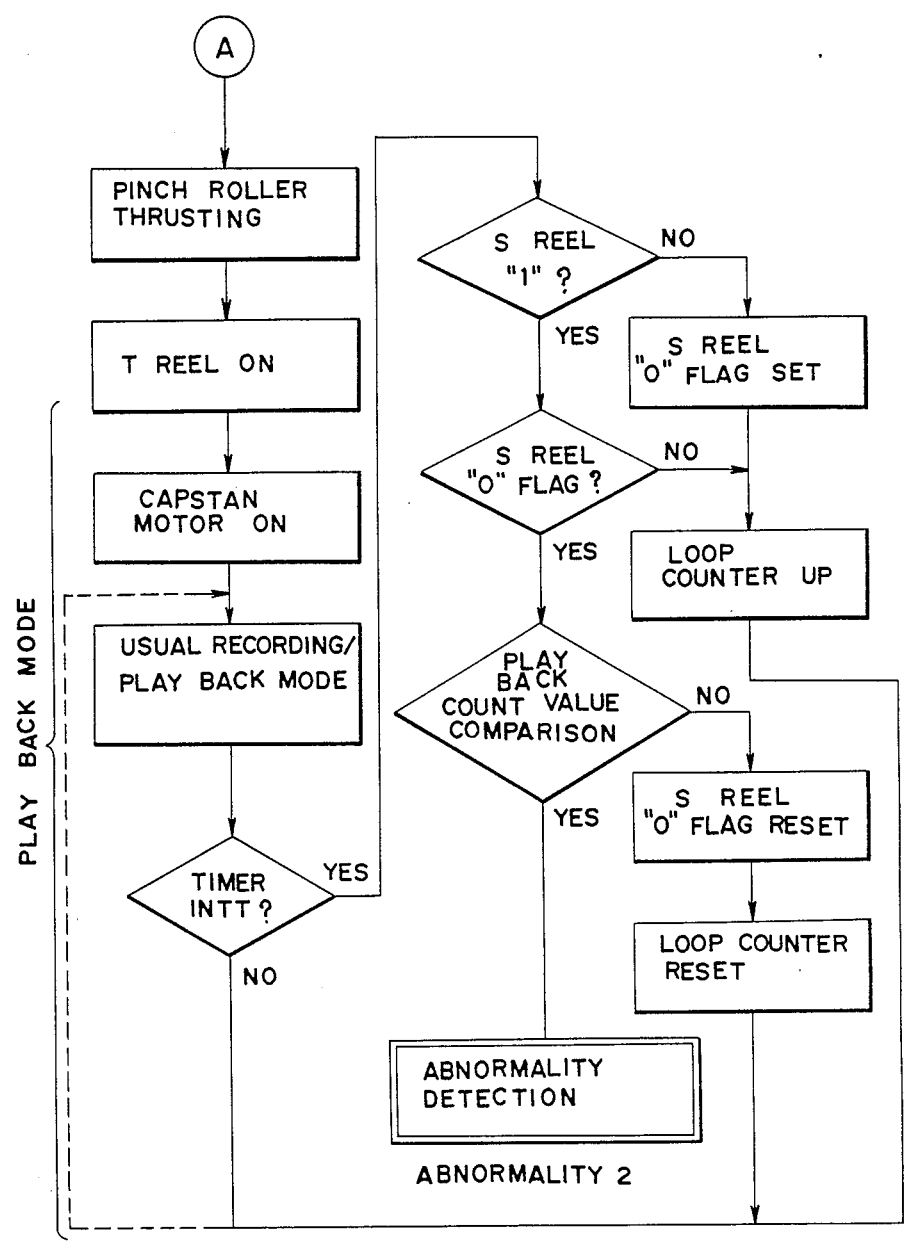

FIG. 15 is a flowchart for explaining the operating mode described above. As it can be understood from the figure, when it is judged by the comparison of the count value at the loading that the period T is smaller than $T_B'$, the process proceeds to ABNORMALITY 1 in the flowchart indicated in FIG. 16. On the other hand, when it is judged by the comparison of the count value at reproducing that the period T described above is smaller than $T_A'$, the process proceeds to ABNORMALITY 2 in the flowchart indicated in FIG. 6. At this time, $T_A'$ and $T_B'$ are different from each other according to this invention and they are determined, as explained already, referring to FIG. 14.

Figure 16:
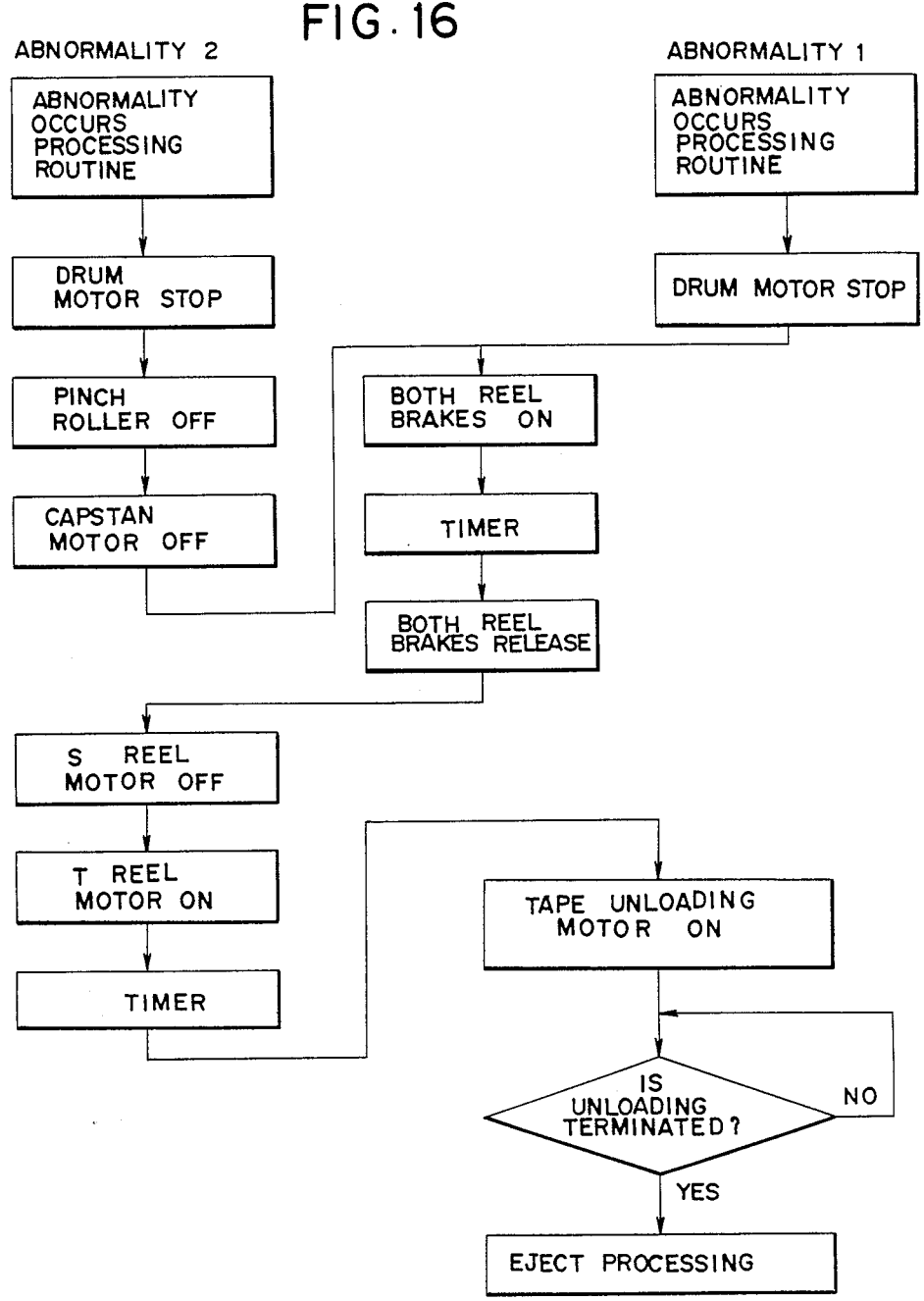

FIG. 16 is a flowchart indicating the processing method after the detection of the sticking of the tape. In the figure, the supply reel motor and the take-up reel motor are motors, which are rotated in order to remove the slackness.

Figure 17:
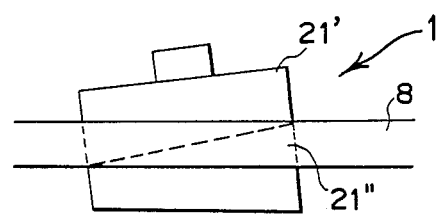
FIG. 17 is a side view of the drum.
Figure 18:
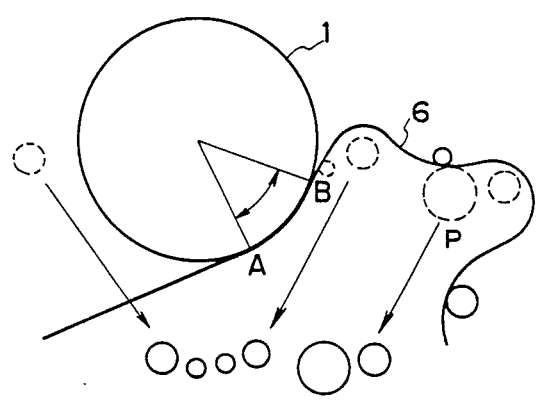
FIG. 18 is a scheme showing the positional relation between the tape and the drum.

The drum 1 is so constructed as indicated in FIG. 17, in which reference numeral 21' represents the upper drum and 21" the lower drum. At the tape unloading the disgorged tape is wound back. However, when the tape is stuck on the rotating drum due to dew condensation, it is stuck also on the lower drum 21". Consequently, even if only the supply reelmotor is rotated in the tape winding 21" between A and B, the slackness on the capstan side can not be removed. In this case, it is possible to remove the slackness on the capstan side by rotating also the take-up reel 3 at the tape unloading and in this way to tear off the tape 8 from the drum 1. That is, as it can be understood from FIG. 6, when sticking of the tape is detected, the system controller 12 produces signals to stop the drum motor, take off the pinch roller P, stop the capstan motor 17 and brake at once both the reels 2 and 3. After a predetermined time has lapsed, the brakes of both the reels 2 and 3 are released and in order to remove the slacknes, the supply reel motor at first and then the take-up reel motor 13 are rotated in the directions to wind up the tape. Again after another predetermined time has lapsed, the tape unloading motor 16 is driven and when the unloading is terminated, the cassette is ejected.

What is claimed is:

1. A tape protection device for use with a magnetic recording/reproducing apparatus of the helical scanning type, said player including take-up and supply reel drive means, a rotatably mounted magnetic drum head, means for rotating said supply reel, said take-up reel, and said head, and loading means for drawing a portion of magnetic tape from a cassette into engagement with said head, said device comprising:

detecting means for providing a rate-indicating signal condition indicative of the rate of rotation of one of said reels;

comparison means responsive to said detecting means for producing a head-stopping signal condition upon receipt of a rate-indicating signal condition indicative of a rate of reel rotation beyond a given value; and head-stopping means responsive to said detecting means for stopping the rotation of said head upon receipt of said head-stopping signal condition.

2. The tape protection device of claim 1 wherein said one of said reels is said supply reel and including supply-reel braking means for braking said supply reel responsively to production of said head-stopping signal condition.

3. The tape protection device of claim 1 wherein said one of said reels is said supply reel and including supply reel rewind drive means for driving said supply reel in a rewind direction during cassette unloading responsively to production of said head-stopping signal condition.

4. The tape protection device of claim 3 including means responsive to production of said head-stopping signal condition for driving said take-up spool in a forward take-up direction during cassette unloading.

5. A tape protection device for use with a magnetic recording/reproducing apparatus of the helical scanning type, said player including take-up and supply reel drive means, a rotatably mounted magnetic drum head, means for rotating said supply reel, said take-up reel, and said head, and loading means for drawing a portion of magnetic tape from a cassette into engagement with said head, said device comprising:

detecting means for providing a rate-indicating signal condition indicative of the rate of rotation of said supply reel;

comparison means responsive to said detecting means for producing a head-stopping signal condition upon receipt of a rate-indicating signal condition indicative of a rate of supply reel rotation beyond a first given value during loading and beyond a second given value during play; and head-stopping means responsive to said detecting means for stopping the rotation of said head upon receipt of said head-stopping signal condition.

6. The tape protection device of claim 5 including supply-reel braking means for braking said supply reel responsively to production of said head-stopping signal condition.

7. The tape protection device of claim 5 including supply reel rewind drive means for driving said supply reel in a rewind direction during cassette unloading responsively to production of said head-stopping signal condition.

8. The tape protection device of claim 7 including means responsive to production of said head-stopping signal condition for driving said take-up spool in a forward take-up direction during cassette unloading.

* * * * *